US011608785B2

United States Patent
Simon et al.

(10) Patent No.: US 11,608,785 B2
(45) Date of Patent: Mar. 21, 2023

(54) MECHANICAL REDUCTION GEAR OF AN AIRCRAFT TURBOMACHINE

(71) Applicant: SAFRAN TRANSMISSION SYSTEMS, Colombes (FR)

(72) Inventors: Adrien Louis Simon, Saint Denis (FR); Simon Loic Clement Lefebvre, Paris (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 9 days.

(21) Appl. No.: 17/225,876

(22) Filed: Apr. 8, 2021

(65) Prior Publication Data
US 2021/0317788 A1 Oct. 14, 2021

(30) Foreign Application Priority Data

Apr. 10, 2020 (FR) ........................ 2003609

(51) Int. Cl.
*F16H 1/28* (2006.01)
*F02C 7/36* (2006.01)
(Continued)

(52) U.S. Cl.
CPC ................ *F02C 7/36* (2013.01); *F16H 1/32* (2013.01); *F16H 57/08* (2013.01); *F16H 57/082* (2013.01);
(Continued)

(58) Field of Classification Search
CPC .......... F16H 1/32; F16H 57/08; F16H 57/082; F16H 2001/2881; F16H 1/2818; F02C 7/36; F05D 2260/40311
(Continued)

(56) References Cited

U.S. PATENT DOCUMENTS 2,444,363 A * 6/1948 Newcomb ................. G01L 3/02
475/158
2,603,107 A * 7/1952 King ...................... B64D 27/00
475/158
(Continued)

FOREIGN PATENT DOCUMENTS

DE 102017124717 A1 * 4/2019
EP 1032779 B1 * 8/2002 ................ F02C 7/36
(Continued)

OTHER PUBLICATIONS

Preliminary Research Report received for French Application No. 2003609, dated Dec. 1, 2020, 5 pages (1 page of French Translation Cover Sheet and 4 pages of original document).

Primary Examiner — Sherry L Estremsky
(74) Attorney, Agent, or Firm — Womble Bond Dickinson (US) LLP

(57) ABSTRACT

A mechanical reduction gear of a turbomachine, in particular of an aircraft. The reduction gear includes a sun gear, a ring gear surrounded by a ring gear carrier, and planet gears meshed with the sun gear and the ring gear. The ring gear carrier includes an axial abutment on which the ring gear is configured to bear, and helical external splines which are engaged in complementary internal splines of the ring gear carrier and which are configured to cooperate by sliding with the internal splines so as to force the ring gear to be held against the abutment in operation.

13 Claims, 5 Drawing Sheets

(51) Int. Cl.
  *F16H 57/08* (2006.01)
  *F16H 1/32* (2006.01)
(52) U.S. Cl.
  CPC .... *F05D 2220/323* (2013.01); *F05D 2220/36* (2013.01); *F05D 2260/40311* (2013.01); *F16H 1/2818* (2013.01)
(58) Field of Classification Search
  USPC .......................................................... 475/338
  See application file for complete search history.

(56) References Cited

U.S. PATENT DOCUMENTS

| | | | | |
|---|---|---|---|---|
| 2,759,376 | A * | 8/1956 | Chamberlin | F16H 1/2809 74/411 |
| 2,825,247 | A * | 3/1958 | Haworth | F16H 1/28 475/158 |
| 2,941,423 | A * | 6/1960 | Armington | F16H 1/48 74/391 |
| 3,433,100 | A * | 3/1969 | Lindgren | F16H 1/2818 475/347 |
| 4,662,246 | A * | 5/1987 | Cheek | B62D 55/125 475/331 |
| 5,433,674 | A * | 7/1995 | Sheridan | F01D 5/02 475/346 |
| 7,144,349 | B2 * | 12/2006 | Mitrovic | F16H 1/2818 74/665 F |
| 7,621,843 | B2 * | 11/2009 | Madge | F03D 15/00 475/346 |
| 11,174,916 | B2 * | 11/2021 | Desjardins | F16H 57/08 |
| 2010/0292043 | A1 | 11/2010 | Tao et al. | |
| 2013/0225353 | A1 | 8/2013 | Gallet et al. | |
| 2017/0122407 | A1 | 5/2017 | Hatch et al. | |

FOREIGN PATENT DOCUMENTS

| | | |
|---|---|---|
| FR | 2987416 A1 | 8/2013 |
| FR | 3011901 A1 | 4/2015 |
| FR | 3041054 A1 | 3/2017 |
| FR | 3058493 A1 | 5/2018 |
| WO | 2010/092263 A1 | 8/2010 |

* cited by examiner

MECHANICAL REDUCTION GEAR OF AN AIRCRAFT TURBOMACHINE

TECHNICAL FIELD

The present invention concerns the field of mechanical reduction gears for turbomachines, in particular aircraft turbomachines, and in particular the reduction gears equipped with double-stage planet gears.

BACKGROUND

The prior art comprises in particular the documents WO-A1-2010/092263, FR-A1-2 987 416, FR-A1-3 011 901, FR-A1-3 041 054, FR-A1-3 058 493, US-A1-2017/122407 and US-A1-2010/292043.

The purpose of a mechanical reduction gear is to change the speed and torque ratio between the input axle and the output axle of a mechanical system.

New generations of double-flow turbomachines, especially those with high bypass ratio, comprise a mechanical reduction gear to drive the shaft of a fan. Typically, the purpose of the reduction gear is to transform the so-called fast rotation speed of the shaft of a power turbine into a slower rotation speed for the shaft driving the fan.

Such a reduction gear comprises a central pinion, called the sun gear, a ring gear and pinions called the planet gears, which are meshed between the sun gear and the ring gear. The planet gears are held in place by a frame called the planet carrier. The sun gear, the ring gear and the planet carrier are planetary gears because their axis of revolution coincide with the longitudinal axis X of the turbomachine. The planet gears each have a different axis of revolution and are equally distributed on the same operating diameter around the axis of the planetary gears. These axes are parallel to the longitudinal axis X.

There are several reduction gear architectures. In the prior art of double-flow turbomachines, the reduction gears are of the planetary or epicyclic type. In other similar applications, there are so-called differential or compound architectures.

- On a planetary reduction gear, the planet carrier is fixed and the ring gear constitutes the output shaft of the device which rotates in the opposite direction to the sun gear.
- On an epicyclic reduction gear, the ring gear is fixed and the planet carrier constitutes the output shaft of the device which rotates in the same direction as the sun gear.
- On a compound reduction gear, no element is fixed in rotation. The ring gear rotates in the opposite direction to the sun gear and the planet carrier.

The reduction gears can comprise one or more gear stages. This meshing is achieved in various ways, such as by contact, friction or magnetic fields.

In the present disclosure, the term "stage" or "toothing" is used to refer to a series of meshing teeth with a series of complementary teeth. A toothing can be internal or external.

A planet gear may comprise one or two gear stages. A single-stage planet gear comprises a toothing which may be straight, helical or chevron-shaped and whose teeth are located on the same diameter. This toothing cooperates with both the sun gear and the ring gear.

A double-stage planet gear comprise two toothing or two series of teeth which are located on different diameters. A first toothing cooperates with the sun gear and a second toothing cooperates with the ring gear.

One of the problems with a mechanical reduction gear is the risk of misalignment of the planet gears. This problem is amplified in the case of double-stage planet gears because the force take-up in the ring gear and the planet carrier is more complex due to the fact that the toothing are located in two different planes perpendicular to the axis of the planet carrier.

The ring gear is subjected to forces in both radial and axial directions which can be significant and which must be limited to prevent movement of the ring gear when the reduction gear is in use.

There is therefore a need to improve the transmission of the forces to which a ring gear is subjected in a mechanical reduction gear equipped with double-stage planet gears.

SUMMARY OF THE INVENTION

The invention concerns a mechanical reduction gear of a turbomachine, in particular of an aircraft, this reduction gear comprising:
- a sun gear having an axis of rotation and comprising an external toothing,
- a ring gear which extends around the sun gear and which comprises an internal toothing, the ring gear being surrounded by a ring gear carrier which is intended to be immobile in rotation around the axis in use,
- planet gears which are in mesh with the sun gear and the ring gear and which each comprise a first toothing of mean diameter D1 meshed with the toothing of the sun gear, and a second toothing of mean diameter D2, different from D1, meshed with the internal toothing of the ring gear, the planet gears being held by a planet carrier which is intended to be movable in rotation about the axis in use,
- the ring gear carrier comprising an annular axial abutment on which the ring gear is configured to bear, and the ring gear comprising helical external splines which are engaged in complementary internal splines of the ring gear carrier and which are configured to co-operate by sliding with these internal splines so as to force the ring gear to be held against the abutment during operation.

The reduction gear according to the invention is thus designed to take up the torque and axial forces to which the ring gear is subjected during operation. Due to the presence of the splines, the ring gear is able to move axially during operation. Thanks to the orientation of the helical splines, which depends on the direction of rotation of the planet gears around the axis, this movement is directed towards the abutment so that the ring gear is forced to bear against this abutment and thus maintain this axial position during operation. The ring gear is therefore axially fixed against this abutment due to the cooperation of the splines. The torque and axial forces acting on the ring gear are transmitted via this abutment to the ring gear carrier, which in turn can transmit them to a stator of the turbomachine.

This invention is compatible with:
- a double-stage reduction gear,
- a so-called epicyclic reduction gear, i.e. the ring gear of which is fixed in the engine reference mark,
- straight or helical toothing,
- any type of planet carrier, whether monobloc or cage and cage carrier type,
- any type of planet gear bearing, whether it is composed of rolling elements, hydrodynamic bearing, etc.

The reduction gear according to the invention may comprise one or more of the following characteristics, taken in isolation from each other, or in combination with each other:

the ring gear carrier comprises a bearing support mounted on a shaft portion of the planet carrier, the bearing support receiving a bearing for rotationally guiding the shaft portion of the planet carrier;

the abutment and the shaft portion are located on the same side with respect to the planet gears;

the ring gear carrier comprises a cylindrical wall comprising said internal splines and a frustoconical wall whose larger diameter end is connected to this cylindrical wall, said abutment being located in a connecting zone of the frustoconical and cylindrical walls;

the rolling bearing is located at the smaller diameter end of the ring gear carrier;

the cylindrical wall is connected to an annular edge extending radially outwards and forming a fixing flange;

the annular edge extends in a plane perpendicular to said axis which passes substantially through the centre of the ring gear and through the centre of a bearing, e.g. a rolling bearing, mounted between the planet carrier and the sun gear;

the abutment is formed by a radially inner annular boss of the ring gear carrier;

the boss comprises a radial face for supporting the ring gear;

the radial face is connected to the internal splines of the ring gear carrier by an annular groove;

the radial face is covered with a protective coating or is intended to cooperate with a protective coating located on the ring gear;

the ring gear carrier comprises an oil film compression damper which at least partially surrounds said ring gear;

on the side opposite the abutment, the ring gear is held axially opposite the ring gear carrier by means of a split locking ring which is engaged in a radially inner annular groove of the ring gear carrier;

the groove and the ring are located at a free axial end of the ring gear carrier, in particular its cylindrical wall;

the internal splines of the ring gear carrier and the external splines of the ring gear extend over the entire axial dimension of the ring gear.

The present invention also relates to an aircraft turbomachine, comprising a reduction gear as described above.

DESCRIPTION OF FIGURES

Other characteristics and advantages will be apparent from the following description of a non-exhaustive embodiment of the invention with reference to the annexed drawings on which.

DETAILED DESCRIPTION

Figure 1:
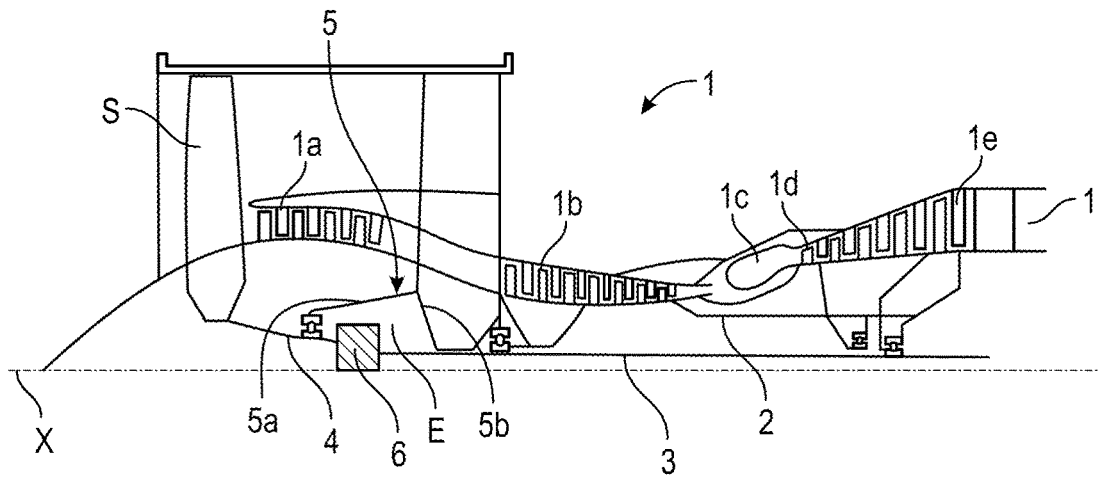
FIG. 1 is a schematic axial section view of an aircraft turbomachine.

FIG. 1 describes a turbomachine 1 which comprises, in a conventional manner, an axis of rotation X, a fan S, a low-pressure compressor 1a, a high-pressure compressor 1b, a combustion annulus chamber 1c, a high-pressure turbine 1d, a low-pressure turbine 1e and an exhaust nozzle 1h. The high-pressure compressor 1b and the high-pressure turbine 1d are connected by a high-pressure shaft 2 and form with it a high-pressure (HP) body. The low-pressure compressor 1a and the low-pressure turbine 1e are connected by a low-pressure shaft 3 and form with it a low-pressure body (LP).

The fan S is driven by a fan shaft 4 which is driven to the LP shaft 3 by means of a reduction gear 6. This reduction gear 6 is usually of the planetary or epicyclic type.

The following description refers to a planetary type reduction gear in which the ring gear is rotatable.

The reduction gear 6 is positioned in the upstream part of the turbomachine. A fixed structure comprising, schematically here, an upstream part 5a and a downstream part 5b which makes up the engine casing or stator 5 is arranged so as to form an enclosure E surrounding the reduction gear 6. This enclosure E is closed off upstream by seals at a bearing allowing the fan shaft 4 to pass through and downstream by gaskets where the LP shaft 3 passes through.

Figure 2:
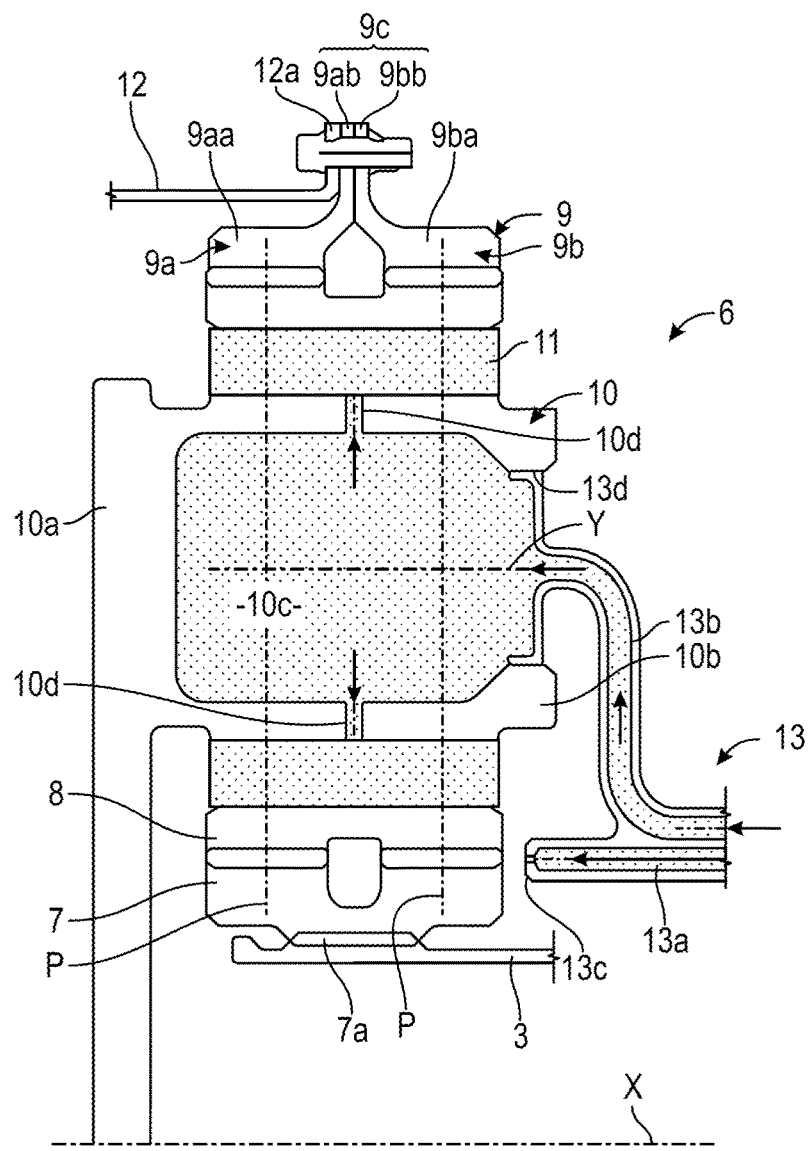
FIG. 2 is an axial section in partial view of a mechanical reduction gear.

FIG. 2 shows a reduction gear 6 which can be designed in different architectures depending on whether some parts are stationary or rotating. At the input side, the reduction gear 6 is connected to the LP shaft 3, for example via internal splines 7a. Thus the LP shaft 3 drives a planet gear called the sun gear 7. Classically, the sun gear 7, whose axis of rotation is the same as that of the turbomachine X, drives a series of gears called planet gears 8, which are evenly distributed on the same diameter around the axis of rotation X. This diameter is equal to twice the operating centre distance between the sun gear 7 and the planet gears 8. The number of planet gears 8 is generally defined between three and seven for this type of application. The set of planet gears 8 is held together by a frame called planet carrier 10. Each planet gear 8 rotates around its own axis Y and meshes with the ring gear 9.

In this planetary configuration, the set of planet gears 8 is held by a planet carrier 10 which is attached to the engine casing or stator 5. Each planet gear drives the ring gear which is attached to the fan shaft 4 via a ring gear carrier 12.

Each planet gear 8 is freely rotatably mounted by means of a bearing 11, e.g. rolling bearing or hydrodynamic bearing. Each bearing 11 is mounted on one of the axles 10b of the planet carrier 10 and all the axles are positioned relative to each other by means of one or more structural frames 10a of the planet carrier 10. There is a number of axles 10b and bearings 11 equal to the number of planet gears. For operational, assembly, manufacturing, inspection, repair or spare parts reasons, the axles 10b and the frame 10a can be separated into several parts.

For the same reasons as mentioned above, the toothing of a reduction gear can be divided into several helices, each with a centre plane P. In the example shown, the ring gear is separated into two half ring gears:

An upstream half-ring gear 9a comprising a rim 9aa and a fixing half-flange 9ab. On the rim 9aa is located the upstream helix of the toothing of the reduction gear.

This upstream helix meshes with that of the planet gear 8, which meshes with that of the sun gear 7.

a downstream half-ring gear 9b comprising a rim 9ba and a fixing half-flange 9bb. On the rim 9ba is located the downstream helix of the toothing of the reduction gear. This downstream helix meshes with that of the planet gear 8 which meshes with that of the sun gear 7.

The fixing half-flange 9ab of the upstream ring gear 9a and the fixing half-flange 9bb of the downstream ring gear 9b form the fixing flange 9c of the ring gear. The ring gear 9 is attached to a ring gear carrier by assembling the fixing flange 9c of the ring gear and the fixing flange 12a of the ring gear carrier using a bolted assembly, for example.

The arrows in FIG. 2 describe the oil supply in the reduction gear 6. The oil enters the reduction gear 6 from the stator part 5 into a distributor 13 by various means which will not be specified in this view as they are specific to one or more types of architecture. The distributor is separated into 2 parts, each of which is usually repeated with the same number of planet gears. The injectors 13a have the function of lubricating the toothing and the arms 13b have the function of lubricating the bearings. The oil is fed to the injector 13a and comes out through the end 13c to lubricate the toothing. The oil is also fed to the arm 13b and flows through the supply orifice 13d of the bearing. The oil then flows through the axles into one buffer zone or buffer zones 10c and comes out through the orifices 10d to lubricate the bearings of the planet gears.

Figure 3:
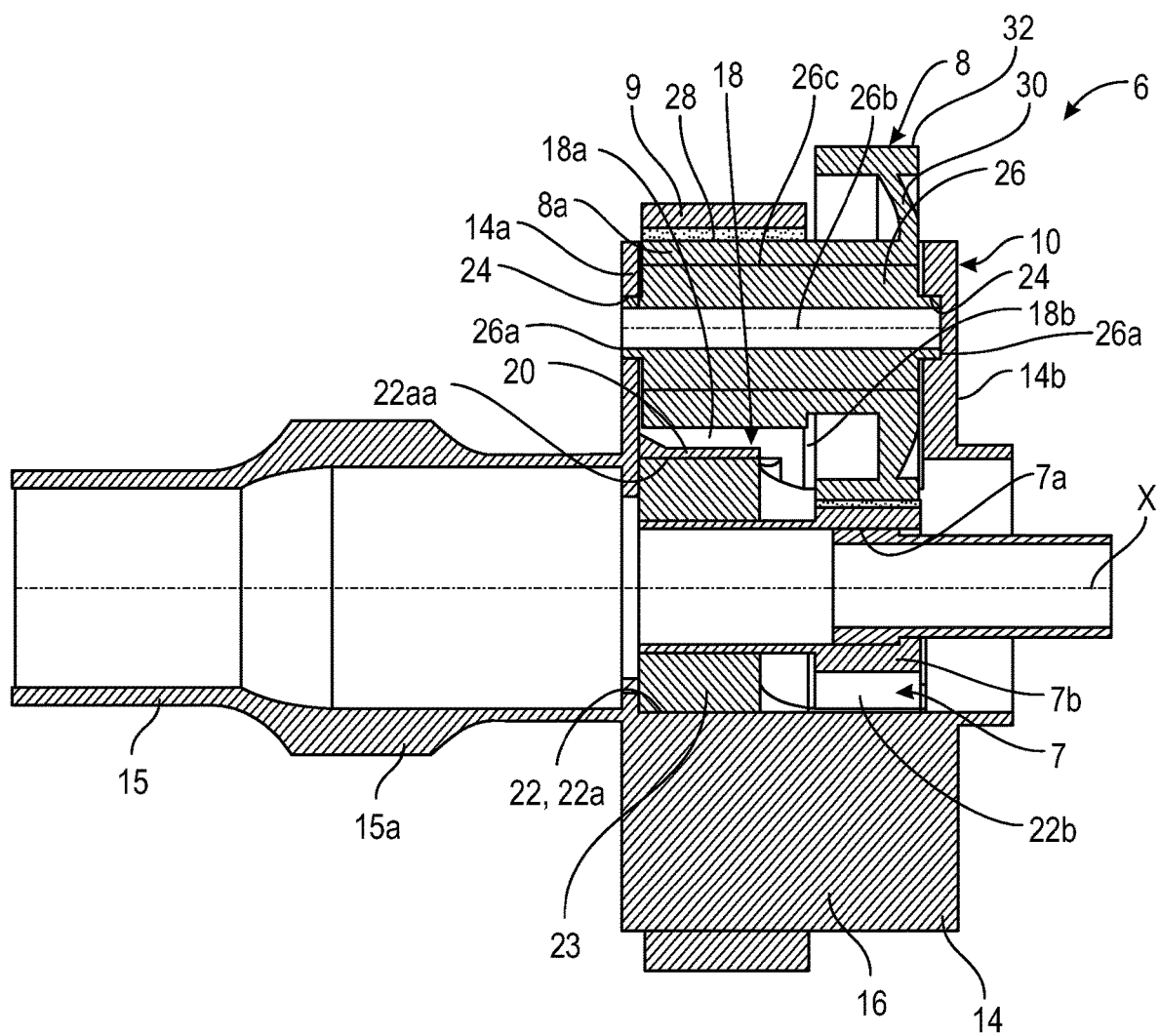
FIG. 3 is a schematic axial section view of a mechanical reduction gear equipped with double-stage planet gears and illustrates the prior art to the invention.
Figure 4:
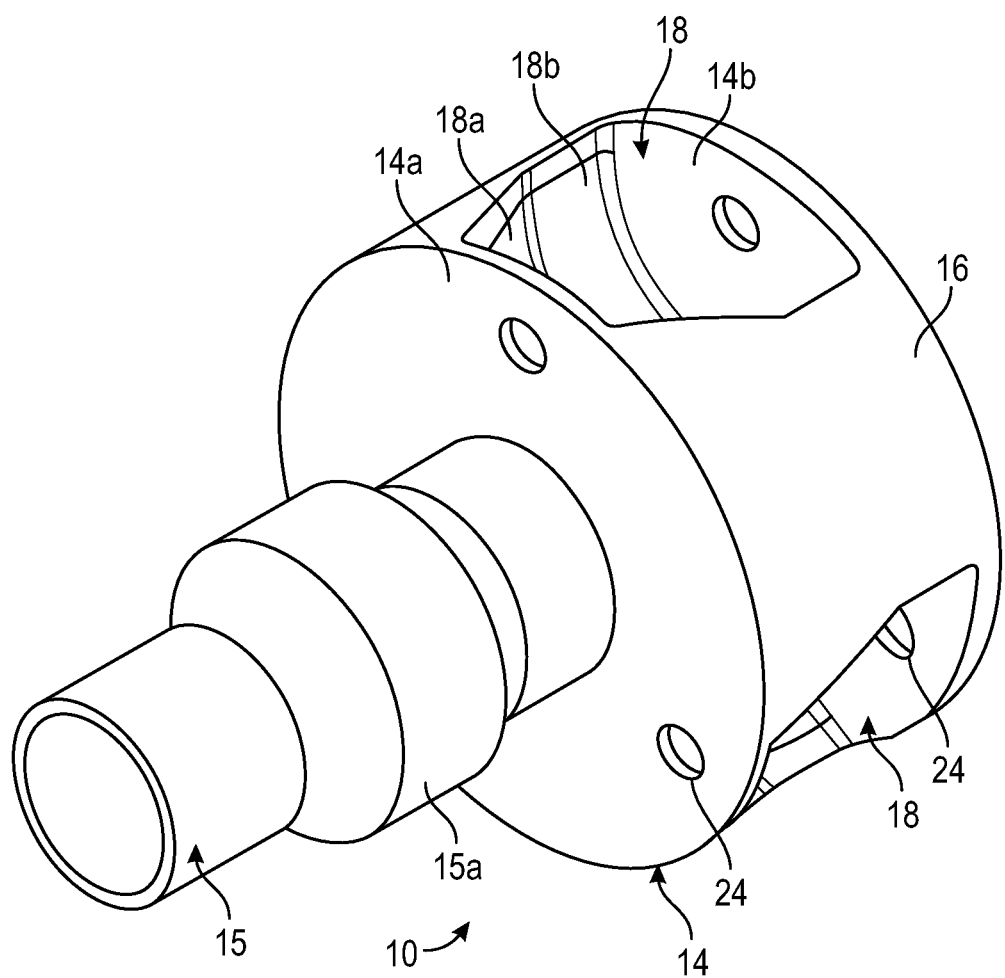
FIG. 4 is a schematic perspective view of the planet carrier of the reduction gear in FIG. 3.

FIGS. 3 and 4 show a reduction gear 6 of an aircraft turbomachine according to the prior art.

The reduction gear 6 comprises a planet carrier 10 which is configured to be rotatable about the axis X and is of the monobloc type, i.e. formed in one piece.

This planet carrier 10 comprises a cage 14 and a shaft portion 15.

The shaft portion 15 has a general tubular shape and is elongated along the axis X and comprises a free longitudinal end, here on the left in the drawings, and an opposite longitudinal end connecting to the cage 14.

The shaft portion 15 comprises an external toothing 15a for meshing, e.g. with a fan.

The cage 14 comprises two annular flanges 14a, 14b which are parallel and spaced apart from each other and extend perpendicular to the axis X. The flanges 14a, 14b have a general circular shape and are centred on the axis X.

The flange 14a, called the first flange, on the left in the drawing, is connected to the shaft portion 15. The other flange 14b is called the second flange.

Figure 5:
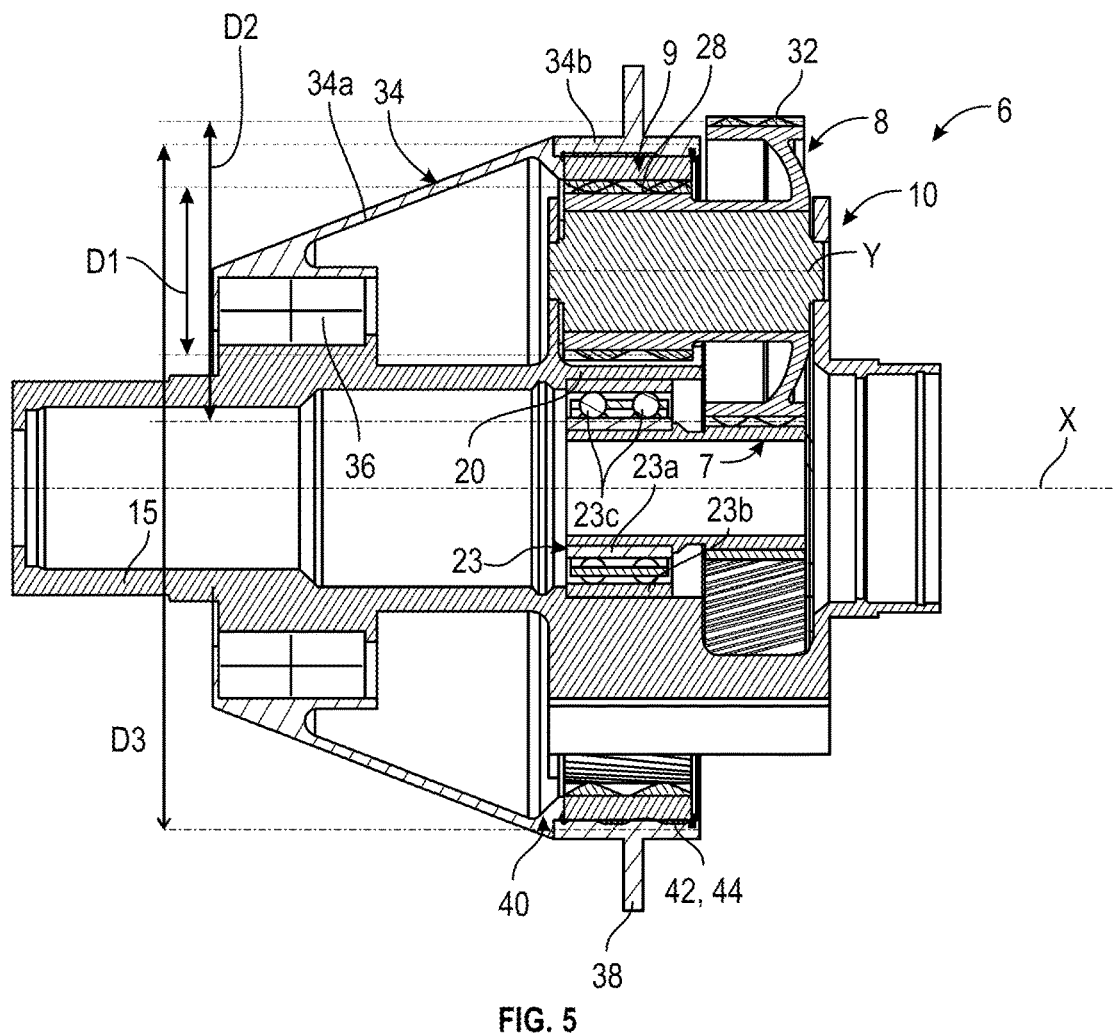
FIG. 5 is a schematic axial section view of a mechanical reduction gear equipped with double-stage planet gears and illustrates an embodiment of the invention.

The flanges 14a, 14b are connected to each other by material bridges 16 which define between them and with the flanges housings 18 configured to receive the planet gears 8. The housings 18 open radially outwards at the outer periphery of the cage 14, and also open radially inwards through an inner tubular wall 20 of the cage 14. The material bridges 16 may be solid or partially hollow, as shown in FIG. 5.

The wall 20 extends around the axis X from the first flange 14a towards the second flange 14b. Here it extends approximately in the axial extension of the shaft section 15. This wall 20 delimits internally a space 22 for housing the sun gear 7.

This space 22 comprises two adjacent parts. The first part 22a is surrounded by the wall 20 which comprises an internal cylindrical surface 22a for mounting a bearing 23 for guiding one end of the sun gear 7. The second part 22b, located at the level of the outlets of the housing 18, receives the opposite end of the sun gear 7, which comprises an external toothing 7b for meshing with the planet gears 8. The sun gear 7 also comprises an internal toothing 7a for coupling to a shaft, for example of a turbine.

The housings 18 each comprise a first part 18a which is located on the side of the first flange 14a, and a second part 18b which is located on the side of the second flange 14b. The housings 18 open at the outer periphery of the cage 14, at the level of its two parts 18a, 18b, and at the inner periphery of the cage 14, at the level of the second parts 18b only.

The flanges 14a, 14b comprise aligned holes or orifices 24 for mounting the planet gears 8 and in particular the plain bearings 26 of these planet gears 8. Each bearing 26 has a general cylindrical shape which extends parallel to the axis X and whose longitudinal ends comprise extensions 26a housed in the orifices 24 forming seats.

As is well known, each bearing 26 may comprise an internal bore 26b of oil circulation which generally communicates with oil supply ducts to the outer cylindrical surface 26c of the bearing in order to form an oil film on this surface 26c.

The planet gears 8 are of the double-stage meshing type, as mentioned above, and each comprise a tubular body 8a equipped with a first external toothing 28 and connected by a web 30 to a second external toothing 32.

The toothing 28, 32 are arranged next to each other and more particularly are located respectively in two planes perpendicular to the axis X.

The first toothing 28, which is on the left in the drawings, is located on the side of the first flange 14a and thus on the first part 18a of the housing. As can be seen in FIG. 3, this toothing 28 is meshed with the ring gear 9.

The second toothing 32, on the right hand side of the drawings, is located on the side of the second flange 14b and therefore on the second part 18b of the housing. As can be seen in FIG. 3, this toothing 32 is meshed with the toothing 7b of the sun gear 7.

As can be seen in FIG. 3, the material bridges 16 extend radially between the housings 18 from the wall 20 and the inner periphery of the flanges 14a, 14b to the outer periphery of the flanges.

The ring gear 9 is carried by a ring gear carrier which is not shown in the drawings.

The invention offers a solution to ensure that the torque and axial forces to which the ring gear 9 is subjected during operation are taken up by the ring gear carrier.

Figure 6:
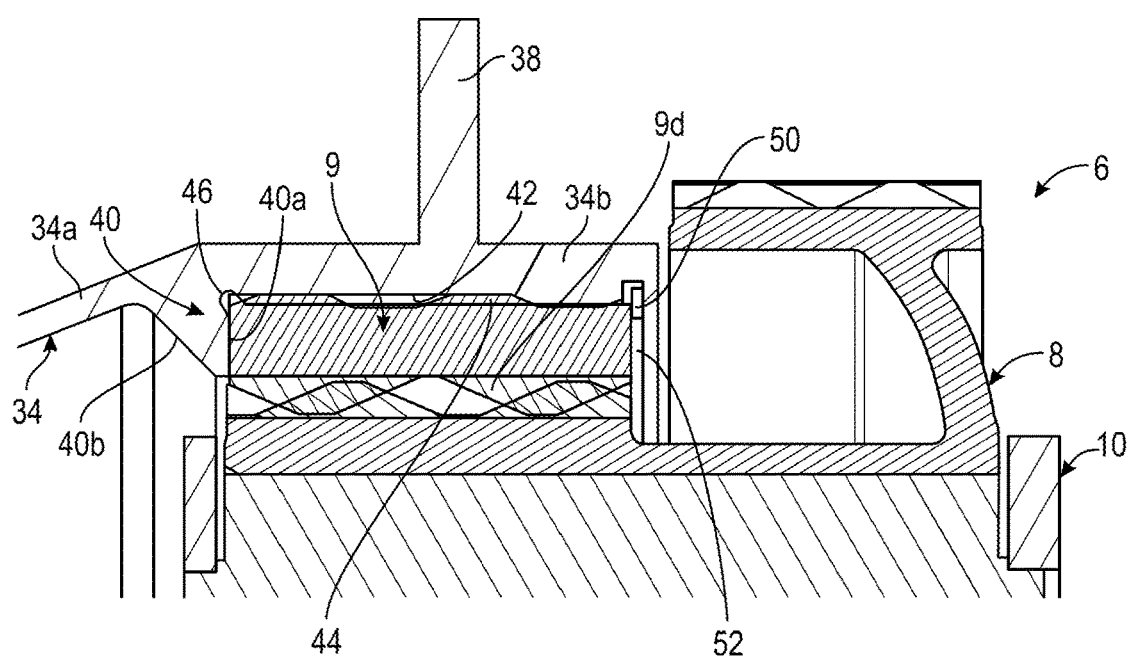
FIG. 6 is a larger-scale schematic view of a part of FIG. 5.
Figure 7:
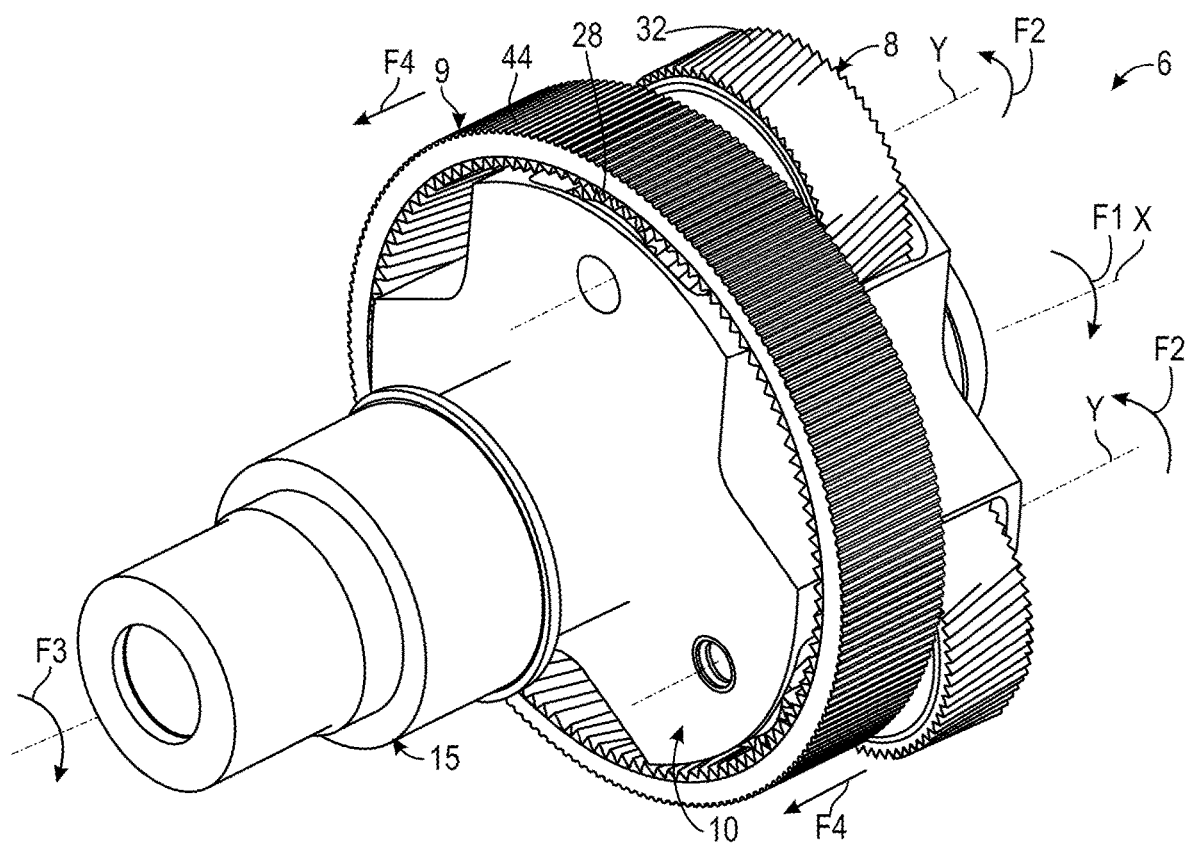
FIG. 7 is a partial schematic perspective view of the reduction gear in FIG. 5.

FIGS. 5 to 7 illustrate a preferred embodiment of a reduction gear 6 according to the invention. This reduction gear 6 comprises all the characteristics described in the above in relation to FIGS. 3 and 4 insofar as they are not contrary to or contradict the following.

The references used in FIGS. 5 to 7 and already used in FIGS. 4 and 5 therefore designate identical or similar elements.

The sun gear 7 is similar to the one described above and is centred and guided in rotation in the planet carrier 10 by means of a rolling bearing 23 which here comprises two rings 23a, 23b between which two adjacent rows of balls 23c are arranged.

The inner ring 23a is mounted on one axial end of the sun gear 7 and its outer ring 23b is mounted in the inner wall 20 of the planet carrier 10.

The planet carrier 10 is itself centred and guided in rotation in a ring gear carrier 34 by means of a bearing 36 which can be a rolling bearing and which comprises for example rollers. The bearing 36 is located on the shaft section 15 of the planet carrier 10, e.g. approximately in its middle.

The bearing 36 can comprise an inner ring mounted on or directly integrated into the shaft section 15. Similarly, the outer ring of the bearing 36 can be mounted in or integrated into the ring gear carrier 34.

In the example shown, the ring gear carrier 34 has a general annular shape around the axis X and extends axially around a part of the shaft section 15 and around the ring gear 9.

The ring gear carrier 34 comprise essentially two axial parts, namely a frustoconical upstream part 34a and a cylindrical downstream part 34b.

The frustoconical part 34a is flared downstream and its smaller diameter upstream end extends around the bearing 36 to support it. It is therefore understandable that the ring gear carrier 34 has a function to support the bearing 36.

The cylindrical part 34b has an average diameter D3 measured in relation to the axis X. D1 is the average diameter of the toothing 28 and D2 is the average diameter of the toothing 32. D1 is smaller than D2 in the example shown, D1 and D2 being measured with respect to the axis Y of the planet gears 8.

The cylindrical part 34b comprises an annular edge 38 extending radially outwards and forming an annular flange for fixing the ring gear carrier 34 to a stator of the turbomachine. This edge 38 comprises, for example, an annular row of orifices (not shown), each of which has an axial orientation and is configured to receive fastening screws.

At the junction between the frustoconical 34a and the cylindrical 34b parts, the ring gear carrier 34 comprises an annular abutment 40 which extends radially inwards. This abutment 40 is in the form of a protruding annular boss. This abutment 40 is located at an axial end, here upstream, of the ring gear 9 and extends axially opposite this ring gear so that the ring gear can be supported on the abutment 40.

The abutment 40 comprises a downstream radial face 40a which supports the upstream end of the ring gear 9 (FIG. 6). In the example shown, the abutment 40 is generally triangular in axial section and therefore comprises an upstream face 40b which is inclined and flared from downstream to upstream outwards.

The cylindrical part 34b of the ring gear carrier 34 comprises internal splines 42 in which external splines 44 complementary to the ring gear 9 are engaged. In the example shown, the external splines 44 of the ring gear 9 extend over the entire axial dimension of the ring gear 9, as do its internal toothing 9d, and the internal splines 42 of the cylindrical part 34b extend over at least 80% of the axial dimension of this part.

The internal splines 42 are connected to the face 40a of the abutment 40 by an annular groove 46 formed in the ring gear carrier 34 at the base or the outer periphery of the abutment 40. This groove 46 may be radially oriented and open radially inwards, or it may be inclined and open radially inwards, oriented from upstream to downstream inwards, as in the example shown in FIG. 6.

According to the invention better seen in FIG. 7, the splines 42, 44 are helical and are able to slide inside each other in the axial direction. It is understandable that this movement is similar to that of a screwdriver because of the helical shapes of the splines.

The winding direction of the helices of the splines 42, 44 is important and depends on the direction of rotation of the planet gears 8 around their axis. This is because the splines 42, 44 must be configured so that during operation the ring gear 9 is axially loaded in the upstream direction and can therefore be held against the abutment 40. The choice of the winding direction of the splines 42, 44 according to the direction of rotation of the planet gears 8 is within the reach of a person skilled in the art.

In the particular example shown in FIG. 7, the sun gear 7 rotates around the axis X in the direction of the arrow F1. It drives the planet gears 8 around the axis Y in the direction of the arrows F2, which in turn drive the planet carrier 10 around the axis X in the direction of the arrow F3. With its helical splines 44, the ring gear 9 is loaded axially in the direction of the arrows F4.

In order to prevent wear of the abutment 40 or the ring gear 9 (e.g. fretting wear), it is possible to cover its side 40a with a protective coating. This coating can be a hard material, i.e. harder than the material of the abutment 40, or an anti-friction material.

Alternatively, this coating could be located on the ring gear 9, e.g. at its upstream end, and cooperate with the face 40a of the abutment 40.

In a variant not shown, an oil film compression damper could be fitted to the ring gear carrier 34 and preferably be mounted around the ring gear 9. The function of this damper would be to dampen the vibrations to which the ring gear 9 would be subjected during operation.

On the side opposite the abutment 40, i.e. downstream in the example shown, the ring gear 9 is held axially opposite the ring gear carrier 34 by means of a split locking ring 50, which can be seen more clearly in FIG. 6. The ring 50 is engaged in a radially inner annular groove 52 of the ring gear carrier 34, which is formed here at the free downstream end of the ring gear carrier 34.

The invention claimed is:

1. A mechanical reduction gear of a turbomachine of an aircraft, the reduction gear comprising:
   a sun gear having an axis of rotation and comprising an external toothing,
   a ring gear which extends around the sun gear and which comprises an internal toothing, the ring gear being surrounded by a ring gear carrier which is intended to be immobile in rotation about the axis in use,
   planet gears which are in mesh with the sun gear and the ring gear and which each comprise a first toothing of mean diameter D1 meshed with the toothing of the sun gear, and a second toothing of mean diameter D2, different from D1, meshed with the internal toothing of the ring gear, the planet gears being held by a planet carrier which is intended to be movable in rotation about the axis in use,
   the ring gear carrier comprising an annular axial abutment on which the ring gear is configured to bear, and the ring gear comprising helical external splines which are engaged in complementary internal splines of the ring gear carrier and which are configured to co-operate by sliding with these internal splines so as to force the ring gear to be held against the annular axial abutment during operation,
   wherein the annular axial abutment is formed by a radially inner annular boss of the ring gear carrier,
   and wherein said radially inner annular boss comprises a radial face for supporting the ring gear, said radial face being connected to the internal splines of the ring gear carrier by an annular groove.

2. The reduction gear according to claim 1, wherein the ring gear carrier comprises a bearing support mounted on a shaft portion of the planet carrier, the bearing support receiving a bearing for rotationally guiding the shaft portion of the planet carrier.

3. The reduction gear according to claim 2, wherein the annular axial abutment and the shaft portion are located on the same side with respect to the planet gears.

4. The reduction gear according to claim 1, wherein the ring gear carrier comprises a cylindrical wall comprising said internal splines and a frustoconical wall whose larger diameter end is connected to this cylindrical wall, said annular axial abutment being located in a connecting zone of the frustoconical and cylindrical walls.

5. The reduction gear according to claim 4, wherein the cylindrical wall is connected to an annular edge extending radially outwards and forming a fixing flange.

6. The reduction gear according to claim 5, wherein the annular edge extends in a plane perpendicular to said axis and which passes substantially through the centre of the ring gear and through the centre of a bearing mounted between the planet carrier and the sun gear.

7. The reduction gear according to claim 1, wherein the radial face is covered with a protective coating or the radial face cooperates by abutment with a protective coating located on the ring gear.

8. The reduction gear according to claim 1, wherein the ring gear is held axially between the annular axial abutment and a split locking ring which is engaged in a radially inner annular groove of the ring gear carrier.

9. The reduction gear according to claim 8, wherein the groove and the split locking ring are located at a free axial end of the ring gear carrier.

10. The reduction gear according to claim 1, wherein the internal splines of the ring gear carrier and the external splines of the ring gear extend over the entire axial dimension of the ring gear.

11. An aircraft turbomachine comprising a reduction gear according to claim 1.

12. A mechanical reduction gear of a turbomachine of an aircraft, the reduction gear comprising:
   a sun gear having an axis of rotation and comprising an external toothing,
   a ring gear which extends around the sun gear and which comprises an internal toothing, the ring gear being surrounded by a ring gear carrier which is intended to be immobile in rotation about the axis in use,
   planet gears which are in mesh with the sun gear and the ring gear and which each comprise a first toothing of mean diameter D1 meshed with the toothing of the sun gear, and a second toothing of mean diameter D2, different from D1, meshed with the internal toothing of the ring gear, the planet gears being held by a planet carrier which is intended to be movable in rotation about the axis in use,
   the ring gear carrier comprising an annular axial abutment on which the ring gear is configured to bear, and the ring gear comprising helical external splines which are engaged in complementary internal splines of the ring gear carrier and which are configured to co-operate by sliding with these internal splines so as to force the ring gear to be held against the annular axial abutment during operation,
   wherein the ring gear is held axially between the annular axial abutment and a split locking ring which is engaged in a radially inner annular groove of the ring gear carrier.

13. A mechanical reduction gear of a turbomachine of an aircraft, the reduction gear comprising:
   a sun gear having an axis of rotation and comprising an external toothing,
   a ring gear which extends around the sun gear and which comprises an internal toothing, the ring gear being surrounded by a ring gear carrier which is intended to be immobile in rotation about the axis in use,
   planet gears which are in mesh with the sun gear and the ring gear and which each comprise a first toothing of mean diameter D1 meshed with the toothing of the sun gear, and a second toothing of mean diameter D2, different from D1, meshed with the internal toothing of the ring gear, the planet gears being held by a planet carrier which is intended to be movable in rotation about the axis in use,
   the ring gear carrier comprising an annular axial abutment on which the ring gear is configured to bear, and the ring gear comprising helical external splines which are engaged in complementary internal splines of the ring gear carrier and which are configured to co-operate by sliding with these internal splines so as to force the ring gear to be held against the annular axial abutment during operation,
   wherein the annular axial abutment is integral with the ring gear carrier, and
   wherein the ring gear is held directly against the annular axial abutment during operation.

* * * * *